(12) United States Patent
Edelmann et al.

(10) Patent No.: US 8,481,654 B2
(45) Date of Patent: Jul. 9, 2013

(54) AQUEOUS SILANE NANOCOMPOSITES

(75) Inventors: Roland Edelmann, Rheinfelden (DE); Bjoern Borup, Rheinfelden (DE); Jaroslaw Monkiewicz, Rheinfelden (DE); Christian Wassmer, Hausen (DE); Kerstin Bibbo, Rheinfelden (DE); Burkhard Standke, Loerrach (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 11/572,691

(22) PCT Filed: Nov. 8, 2004

(86) PCT No.: PCT/EP2004/052857
§ 371 (c)(1),
(2), (4) Date: Jan. 25, 2007

(87) PCT Pub. No.: WO2006/010388
PCT Pub. Date: Feb. 2, 2006

(65) Prior Publication Data
US 2008/0058489 A1    Mar. 6, 2008

(30) Foreign Application Priority Data
Jul. 29, 2004 (DE) .................. 10 2004 037 045

(51) Int. Cl.
*C08G 77/38* (2006.01)
*C08G 77/382* (2006.01)
*C08L 83/06* (2006.01)

(52) U.S. Cl.
USPC ............................ 525/477; 427/334; 428/447

(58) Field of Classification Search
USPC .............. 428/447; 106/38.2; 524/588; 528/9; 427/334; 525/477
See application file for complete search history.

(56) References Cited

U.S. PATENT DOCUMENTS

| | | | |
|---|---|---|---|
| 3,898,090 A * | 8/1975 | Clark | 106/38.2 |
| 4,226,793 A | 10/1980 | Kotzsch et al. | |
| 4,394,177 A | 7/1983 | Fujioka et al. | |
| 5,314,947 A | 5/1994 | Sawaragi | |
| 5,357,024 A | 10/1994 | LeClaire | |
| 5,591,818 A | 1/1997 | Standke et al. | |
| 5,629,400 A | 5/1997 | Standke et al. | |
| 5,679,147 A | 10/1997 | Standke et al. | |
| 5,786,493 A | 7/1998 | Rauleder et al. | |
| 5,808,125 A * | 9/1998 | Standke et al. | 556/424 |
| 5,849,942 A | 12/1998 | Standke et al. | |
| 5,863,509 A | 1/1999 | Standke et al. | |
| 5,885,341 A | 3/1999 | Standke et al. | |
| 5,932,757 A | 8/1999 | Standke et al. | |
| 6,018,011 A | 1/2000 | Scheim et al. | |
| 6,054,601 A | 4/2000 | Standke et al. | |
| 6,118,015 A | 9/2000 | Haas et al. | |
| 6,133,466 A | 10/2000 | Edelmann et al. | |
| 6,139,622 A | 10/2000 | Gobel et al. | |
| 6,176,918 B1 | 1/2001 | Glausch et al. | |
| 6,177,582 B1 | 1/2001 | Jenkner et al. | |
| 6,228,936 B1 | 5/2001 | Standke et al. | |
| 6,239,194 B1 | 5/2001 | Standke et al. | |
| 6,251,989 B1 | 6/2001 | Edelmann et al. | |
| 6,255,513 B1 | 7/2001 | Standke et al. | |
| 6,265,029 B1 * | 7/2001 | Lewis | 427/378 |
| 6,288,256 B1 | 9/2001 | Standke et al. | |
| 6,361,871 B1 | 3/2002 | Jenkner et al. | |
| 6,378,599 B1 * | 4/2002 | Schmidt et al. | 164/525 |
| 6,395,858 B1 | 5/2002 | Mack et al. | |
| 6,403,228 B1 | 6/2002 | Mack et al. | |
| 6,491,838 B1 | 12/2002 | Standke et al. | |
| 6,534,667 B1 | 3/2003 | Standke et al. | |
| 6,620,514 B1 * | 9/2003 | Arpac et al. | 428/447 |
| 6,641,870 B2 | 11/2003 | Bartkowiak et al. | |
| 6,663,683 B2 | 12/2003 | Lortz et al. | |
| 6,673,458 B2 * | 1/2004 | Mager et al. | 428/450 |
| 6,676,719 B2 | 1/2004 | Lortz et al. | |
| 6,685,766 B2 | 2/2004 | Standke et al. | |
| 6,689,468 B2 | 2/2004 | Edelmann et al. | |
| 6,695,904 B2 | 2/2004 | Burger et al. | |
| 6,699,586 B2 | 3/2004 | Edelmann et al. | |
| 6,713,186 B1 | 3/2004 | Jenkner et al. | |
| 6,727,375 B2 | 4/2004 | Steding et al. | |
| 6,767,377 B2 | 7/2004 | Schumacher et al. | |
| 6,767,982 B2 | 7/2004 | Standke et al. | |
| 6,770,327 B2 | 8/2004 | Edelmann et al. | |
| 6,773,697 B2 | 8/2004 | Hemme et al. | |

(Continued)

FOREIGN PATENT DOCUMENTS

| | | |
|---|---|---|
| GB | 1 475 103 | 6/1977 |
| GB | 2 041 956 | 9/1980 |
| KR | 1993 0003350 | 4/1993 |
| WO | 99 52964 | 10/1999 |
| WO | WO 03022952 A * | 3/2003 |
| WO | WO03022952 A1 * | 3/2003 |
| WO | 03 037593 | 5/2003 |

OTHER PUBLICATIONS

Zirconium N-Propoxide Data Sheet from Chemical Book. 2010.*

(Continued)

*Primary Examiner* — Randy Gulakowski
*Assistant Examiner* — Kara Boyle
(74) *Attorney, Agent, or Firm* — Oblon, Spivak, McClelland, Maier & Neustadt, L.L.P.

(57) ABSTRACT

The present invention provides a composition based on the reaction at least of the following components: (i) a glycidyloxypropylalkoxysilane, (ii) an aqueous silica sol having an $SiO_2$ content of >20% by weight, (iii) an organic acid hydrolysis catalyst, and (iv) n-propyl zirconate, butyl titanate or titanium acetylacetonate as crosslinker, a process for its preparation, and the use thereof, particularly as a composition for scratch resistant coatings, and also provides articles thus coated.

20 Claims, No Drawings

U.S. PATENT DOCUMENTS

| | | | |
|---|---|---|---|
| 6,773,814 B2 | 8/2004 | Schumacher et al. |
| 6,808,769 B2 | 10/2004 | Batz-Sohn et al. |
| 6,830,816 B2 | 12/2004 | Mehnert et al. |
| 6,841,197 B2 | 1/2005 | Standke et al. |
| 6,905,632 B2 | 6/2005 | Lortz et al. |
| 6,946,537 B2 | 9/2005 | Krafczyk et al. |
| 6,991,190 B2 | 1/2006 | Lortz et al. |
| 7,015,270 B2 | 3/2006 | Scharfe et al. |
| 7,026,398 B2 | 4/2006 | Monkiewicz et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,423,186 B2 | 9/2008 | Standke et al. |
| 7,425,598 B2 * | 9/2008 | Kutsuna et al. | 525/531 |
| 7,427,442 B2 | 9/2008 | Albert et al. |
| 7,470,423 B2 | 12/2008 | Lortz et al. |
| 7,538,142 B2 | 5/2009 | Lortz et al. |
| 7,572,854 B2 | 8/2009 | Schneider et al. |
| 7,578,877 B2 | 8/2009 | Giessler et al. |
| 7,615,577 B2 | 11/2009 | Lortz et al. |
| 7,625,975 B2 | 12/2009 | Barfurth et al. |
| 7,645,335 B2 | 1/2010 | Lortz et al. |
| 7,749,322 B2 | 7/2010 | Schumacher et al. |
| 7,780,777 B2 | 8/2010 | Perlet et al. |
| 7,815,936 B2 | 10/2010 | Hasenzahl et al. |
| 7,976,719 B2 | 7/2011 | Batz-Sohn et al. |
| 8,012,367 B2 | 9/2011 | Hasenzahl et al. |
| 2001/0032568 A1 * | 10/2001 | Schutt | 106/287.11 |
| 2002/0098243 A1 | 7/2002 | Edelmann et al. |
| 2002/0099161 A1 * | 7/2002 | Mager et al. | 528/10 |
| 2002/0127415 A1 | 9/2002 | Standke et al. |
| 2002/0192385 A1 | 12/2002 | Jenkner et al. |
| 2002/0197311 A1 | 12/2002 | Hasenzahl et al. |
| 2003/0018155 A1 | 1/2003 | Krafczyk et al. |
| 2003/0041779 A1 * | 3/2003 | Burger et al. | 106/287.14 |
| 2003/0108580 A1 | 6/2003 | Hasenzahl et al. |
| 2003/0203117 A1 | 10/2003 | Bartkowiak et al. |
| 2003/0228271 A1 | 12/2003 | Batz-Sohn et al. |
| 2004/0240062 A1 | 12/2004 | Lortz et al. |
| 2005/0169861 A1 | 8/2005 | Lortz et al. |
| 2005/0265934 A1 | 12/2005 | Schumacher et al. |
| 2006/0063002 A1 | 3/2006 | Edelmann et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0054056 A1 | 3/2007 | Albert et al. |
| 2007/0110912 A1 | 5/2007 | Standke |
| 2007/0231280 A1 | 10/2007 | Schumacher et al. |
| 2007/0297998 A1 | 12/2007 | Meyer et al. |
| 2008/0003448 A1 | 1/2008 | Standke et al. |
| 2008/0095724 A1 | 4/2008 | Hasenzahl et al. |
| 2008/0187673 A1 | 8/2008 | Standke et al. |
| 2008/0188617 A1 | 8/2008 | Standke et al. |
| 2008/0210130 A1 | 9/2008 | Giessler-Blank et al. |
| 2008/0213325 A1 | 9/2008 | Schumacher et al. |
| 2008/0249237 A1 | 10/2008 | Hager et al. |
| 2008/0264299 A1 | 10/2008 | Lortz et al. |
| 2009/0007818 A1 | 1/2009 | Militz et al. |
| 2009/0011246 A1 | 1/2009 | Giessler-Blank et al. |
| 2009/0047225 A1 | 2/2009 | Hasenzahl et al. |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0117021 A1 | 5/2010 | Batz-Sohn et al. |
| 2010/0209339 A1 | 8/2010 | Schumacher et al. |
| 2010/0209719 A1 | 8/2010 | Borup et al. |
| 2010/0233392 A1 | 9/2010 | Batz-Sohn et al. |
| 2010/0308287 A1 | 12/2010 | Lortz et al. |
| 2011/0144226 A1 | 6/2011 | Spyrou et al. |
| 2011/0178238 A1 | 7/2011 | Koschabek et al. |
| 2011/0259240 A1 | 10/2011 | Jenkner et al. |
| 2011/0268899 A1 | 11/2011 | Albert et al. |
| 2012/0031302 A1 | 2/2012 | Albert et al. |
| 2012/0125234 A1 * | 5/2012 | Veith et al. | 106/287.17 |

OTHER PUBLICATIONS

Encyclopedia of Nutrition and Good Food. Robert Ronzio. 2003. p. 253, Fat Substitute.*

Bagheri et al., "The influence of different preparation methods on the aggregation status of pyrogenic nanosilicas used in concrete," from Materials and Structures, 2013, vol. 46, pp. 135-143.*

U.S. Appl. No. 11/995,215, filed Jan. 10, 2008, Jenkner, et al.

U.S. Appl. No. 11/995,751, filed Jan. 15, 2008, Edelmann, et al.

U.S. Appl. No. 11/995,550, filed Jan. 14, 2008, Edelmann, et al.

U.S. Appl. No. 11/576,504, Apr. 2, 2007, Mueh, et al.

U.S. Appl. No. 12/159,785, filed Jul. 1, 2008, Standke, et al.

U.S. Appl. No. 12/161,112, filed Jul. 16, 2008, Standke, et al.

U.S. Appl. No. 13/580,194, filed Aug. 21, 2012, Borup, et al.

* cited by examiner

AQUEOUS SILANE NANOCOMPOSITES

The present invention relates to an aqueous composition based on silane and silica sol by the sol-gel process (also referred to below as silane nanocomposites or just nanocomposites) and to the preparation and use thereof.

Silanes are attracting increasing interest as substances for use in the preparation of nanocomposites by the sol-gel process; EP 1 288 245 A, EP 0 982 348 A, DE 198 16 136 A, WO 99/036359, among others. Nanocomposites of this kind are generally used as coating materials, for a very wide variety of applications.

A substantial disadvantage of known coating systems based on sol-gel formulations is frequently the presence of chloride and a high fraction of organic, generally volatile and also toxic solvents, obtained as a byproduct in the hydrolysis of the silanes or added as diluents. The use of an amount of water insufficient for complete hydrolysis of the silanes, and the utilization of acidic hydrolysis catalysts, makes it possible to prepare sol-gel systems which are stable on storage for months but contain solvent. It is also known that increasing the amount of water leads to complete hydrolysis of the alkoxy groups and hence to drastic reduction in the storage stability of the systems and/or to rapid gelling at the end of the process of hydrolysis, especially if such systems are to have a very high solids content.

It was an object of the present invention to provide further reactive, essentially aqueous nanocomposites by the sol-gel process. A particular concern was to find very environment-friendly nanocomposites which additionally, despite a relatively high solids content, are very stable on storage and also make it possible to obtain coatings having advantageous properties.

This object is achieved in accordance with the invention as specified in the claims.

Surprisingly it has been found that an essentially aqueous hydrolysate which is particularly reactive for coating purposes is obtainable in a simple and economic way by mixing at least (i) one glycidyloxypropylalkoxysilane, (ii) one colloidally disperse, aqueous silica sol having a solids content of >20% by weight, preferably >30% by weight, (iii) one organic acid hydrolysis catalyst, especially acetic acid, propionic acid or maleic acid, and (iv) zirconium tetrapropoxide [also called n-propyl zirconate: $Zr(O-C_3H_7)_4$], butyl titanate, especially n-butyl titanate [$Ti(O-C_4H_9)_4$] or titanium acetylacetonate as crosslinker. It is also possible to remove the hydrolysis alcohol from the hydrolysate in an advantageous way, particularly in the case of the toxic methanol, substantially, i.e., to <5% by weight down to residues in the region of the detection limit, and if required to replace them quantitatively by water. The present hydrolysates (also referred to below as composition, coating material, nanocomposites or compositions for short) are further distinguished by comparatively outstanding storage stability, i.e., stability on storage for up to four months. The present compositions, moreover, are environment-friendly, being substantially free from chloride, i.e., containing preferably less than 0.8% by weight, in particular less than 0.5% by weight, of chloride, based on the composition, and having only a comparatively low fraction of volatile organic constituents (VOC fraction), of fire hazard substances or even of toxic substances, in conjunction with a high solids content in the sense of DIN ISO 3251. Thus compositions of the invention generally also have a relatively high flash point, preferably of around=90° C. Moreover, coatings obtainable following application of one of the present compositions are distinguished by outstanding resistance to water and by excellent hardness and scratch resistance.

The present invention accordingly provides a composition based on the reaction at least of the following components:
(i) a glycidyloxypropylalkoxysilane,
(ii) an aqueous silica sol having an $SiO_2$ content of >20% by weight,
(iii) an organic acid hydrolysis catalyst, and
(iv) n-propyl zirconate, butyl titanate or titanium acetylacetonate as crosslinker.

Component (i) is preferably selected from the group consisting of 3-glycidyloxypropyltrimethoxysilane, 3-glycidyloxypropyltriethoxysilane, 3-glycidyloxypropylmethyldimethoxysilane and 3-glycidyloxypropylmethyldiethoxysilane or a mixture of at least two of the aforementioned silanes.

As component (ii) preference is given to a usually cationic, colloidally disperse silica sol having a solids content of >20 to 50% by weight, more preferably from 30 to 50% by weight, in particular from 40 to 50% by weight, i.e., around 45% by weight, the solids content being determined in accordance with DIN EN ISO 3251. Preferred aqueous silica sols have in particular a pH of from 3 to 5, in particular from 3.5 to 4. Alternatively silica sol stabilized alkalinically can be used. The particle size distribution can be determined in conventional manner by means of laser diffraction (Coulter LS particle size meter). Furthermore, silica sols used in accordance with the invention may contain not only amorphous, aqueous $SiO_2$ particles but also further sol-gel-forming, aqueous element oxides, such as aluminum oxides, or silicon/aluminum oxides. Preferred silica sols, moreover, generally comprise amorphous, aqueous oxide particles having an average particle size of from 40 to 400 nm. The pH can be determined in conventional manner, such as by means of pH paper or pH sticks, for example.

Further preferred is an organic acid from the group consisting of acetic acid, propionic acid and maleic acid as component (iii). Thus a composition of the invention contains preferably from 0.01 to 3% by weight of component (iii), more preferably from 0.5 to 2% by weight, in particular from 1 to 2% by weight, based on the composition.

The crosslinker of component (iv) can be used as a powder or in alcoholic solution when preparing the composition of the invention. Compositions of the invention are based preferably on a component (iv) containing from 0.5 to 8% by weight.

For compositions of the invention it is also possible with advantage to use, as a further component (v), a tetraalkoxysilane, especially tetraethoxysilane, at least one alkylsilane, suitably an alkylalkoxysilane, especially dimethyldiethoxysilane or methyltrimethoxysilane, and/or a phenyltrimethoxysilane, especially phenyltriethoxysilane or phenyltrimethoxysilane. Thus a composition of the invention may contain component (v) in an amount of from 1 to 10% by weight, based on the composition. Suitably in this case a fraction of component (ii) is replaced correspondingly by component (v).

Compositions of the invention are generally slightly cloudy to opalescent liquids and surprisingly are distinguished by sol particles having a mean diameter of from 40 to 200 nm, preferably from 50 to 100 nm. The diameter of the sol particles can be determined conventionally for example by means of laser diffraction. A particular surprise in this context is that compositions of the invention advantageously also possess a virtually unchanged particle size distribution over a storage time of around 3.5 months; that is, they are stable upon storage.

Furthermore, compositions of the invention are advantageously distinguished by a solids content of >40 to <60% by weight, preferably from 45 to 55% by weight, in particular from 45 to 50% by weight, based on the overall composition. The solids content of the present compositions is suitably determined by a method based on DIN ISO 3251, as described in the examples. It is additionally possible to adjust the solids content and also the viscosity of the present compositions by adding water. Advantageously in that case the addition of water is advantageously made so that the solids content is approximately 50% by weight. High-solids-content compositions of this kind, which are in accordance with the invention, are generally stable, advantageously, on storage for approximately four months.

Compositions of the invention are distinguished, furthermore, by a comparatively low hydrolysis alcohol content of <5% by weight, preferably <3% by weight, based on the overall composition. The alcohol content of a composition of the invention can be determined, for example, by gas chromatography in conventional manner.

The storage stability may be further prolonged by adding not only water but also a particularly suitable organic solvent, e.g., =10% by weight of 1-methoxy-2-propanol.

Thus compositions of the invention may advantageously have a 1-methoxy-2-propanol content of =10% by weight, preferably from 5 to 10% by weight, based on the overall composition. Systems of this kind are generally also distinguished by a high flash point.

Aqueous compositions of the invention preferably have, as a calculation parameter, a water content of around 70 to 30% by weight, more preferably from 65 to 50% by weight, based on the overall composition. With a fraction of around >50% water as solvent the "nonvolatiles content" of such coating compositions is generally determined. The determination is made usually by evaporating the water and also alcohol, in accordance with DIN EN ISO 3251—"determining the nonvolatiles content". For that purpose the composition is generally conditioned at 125° C. for one hour in a single-use aluminum dish and the nonvolatiles content is determined by differential weighing. The determination method is employed predominantly for coating materials, binders for coating materials, polymer dispersions, condensation resins, polymer dispersions containing fillers, pigments, etc. The values determined by this method are relative values. Thus in the case of compositions of the invention a particularly preferred nonvolatiles content is from 45 to 50% by weight.

Compositions of the invention may further include at least one surfactant. By this means it is possible in particular, by adding a silicone surfactant, BYK-348 for example (polyether-modified polydimethylsiloxane), to bring about an additional improvement in substrate wetting, which may contribute advantageously to preventing leveling problems during the production of coatings, especially on metallic substrates. Preference is given in general to a surfactant content of <0.5% by weight, in particular from 0.1 to 0.3% by weight, based on the composition.

It is also possible to add what are called hydrosil systems to compositions of the invention.

By hydrosol systems are meant here substantially water-based, chloride-free, predominantly slightly acidic, aqueous systems which comprise a mixture of water-soluble, almost completely hydrolyzed (fluoro)alkyl-/aminoalkyl-/hydroxy- (or alkoxy-)siloxanes, as can be found for example in EP 0 716 127 A, EP 0 716 128 A, EP 0 846 717A and EP 1 101 787 A. It is particularly advantageous to add DYNASYLAN® F 8815 to a present composition in a weight ratio of from 1:0.01 to 0.01:1, more preferably from around 1:0.1 to 0.1:1, the aqueous DYNASYLAN® F 8815 used here preferably having an active substance content <40% by weight, more preferably from 0.1 to 20% by weight, in particular from around 13 to 15% by weight, based on the composition and determined in accordance with DIN EN ISO 3251, as described above. Compositions of the invention that are obtained in this way are distinguished on application, advantageously, by strongly hydrophobic and oleophobic properties of the coating (which is also referred to as being "easy to clean").

Likewise provided by the present invention is a process for preparing a composition of the invention by combining components (i), (ii), (iii), (iv) and, if desired, (v), mixing them with or without the addition of at least one further diluent, and allowing them to react.

As diluents in the present process it is possible to use water, methanol, ethanol and/or 1-methoxy-2-propanol.

In the process of the invention the reaction is carried out preferably at a temperature of from 0 to 35° C., more preferably at from 5 to 25° C., for a time of from 1 to 60 minutes, more preferably for from 5 to 20 minutes, and allowing the resultant product mixture to afterreact suitably at a temperature of around 35 to 85° C., preferably from 50 to 60° C. or from 60 to 70° C., i.e., preferably somewhat below the boiling point of the hydrolysis alcohol, for from 10 minutes to 4 hours, more preferably from 30 minutes to 3 hours. Reaction and afterreaction are generally carried out with thorough mixing, achieved for example by means of stirring.

Subsequently it is possible to remove the hydrolysis alcohol formed during the reaction from the resultant product mixture, said alcohol being in particular methanol, ethanol and/or n-propanol, and being removed from the system by distillation under reduced pressure, and if desired it is possible to replace the amount of alcohol removed by a corresponding amount of water.

Moreover it is possible to add to the reaction mixture or product mixture a surfactant, an example—but not an exclusive example—being BYK 348.

An alternative possibility is to dilute the resultant product mixture, which is generally cloudy to opalescent, or to adjust it to the desired solids content, as far as possible, using water and/or 1-methoxy-2-propanol.

Additionally it is possible to add a hydrosil, preferably one comprising a fluoro-functional active substance, to the present product mixture or present composition. In that case the hydrosil is added in particular in the form of a concentrate in an amount of from 13 to 15% by weight, calculated as active substance and based on the subsequent composition, with thorough mixing. Compositions obtained in this way are distinguished following application by a hard, scratch-resistant coating, and additionally such a coating has a contact angle, in wetting tests with water, of >105°.

Consequently the present invention also provides compositions which are obtainable by the process of the invention.

Generally speaking, compositions of the invention can be prepared as follows:

Generally components (i), (ii), (iii) and (iv) are introduced as an initial charge and mixed, with the addition if desired, as a further component, of (v) and, if desired, of a diluent.

As a result of a high fraction of silica sol it is possible to introduce substantially more water into the mixture than is required for the hydrolysis of the silane as per (i). The beginning of hydrolysis is generally accompanied by a slight rise in the temperature of the reaction mixture. In this case it is possible additionally to carry out cooling or, if necessary, gentle heating. The reaction mixture or product mixture is suitably left to afterreact for a certain time at a slightly higher temperature, with stirring. Consequently the product after reaction is a hydrolysate with, in general, a large quantity of water and also hydrolysis alcohol, methanol ethanol or n-propanol for example. In spite of this the hydrolysate is stable on storage. The hydrolysis is also the starting point for slow condensation of the silane molecules with one another, but also with OH groups on the surface of the $SiO_2$ particles, leading to initial formation of an organic/inorganic network, despite which there is generally no deposition of reaction product.

A further possibility is to remove the hydrolysis alcohol, especially toxic methanol, from the resulting product mixture and to replace it by corresponding amounts of water.

In this way advantageously storage-stable, slightly cloudy, opalescent, highly mobile liquids are obtained with a high solids content. Compositions of the invention are also in general particularly application-friendly, owing to their rheological properties.

It is also possible with advantage to admix further components to the present composition, examples being a surfactant, further amounts of water, 1-methoxy-2-propanol and a hydrosol mixture, to name but a few examples.

Compositions of the invention are generally employed by application to a substrate, such as by brushing, spraying, squirting, knife coating or dipping, for example, to name but a few possibilities. Normally then the coating is left to undergo initial drying briefly, after which it can be subjected to thermal aftertreatment. Thus after the coating operations it is preferred to carry out thermal treatment at a temperature >150° C. Compositions of the invention are also distinguished by excellent applications properties.

With compositions of the invention (also called sol-gel systems) it is possible, then, for example—but not exclusively—to produce a transparent, scratch-resistant layer approximately 1 to 5 μm thick, advantageously, on an aluminum substrate by controlled knife application of the coating material of the invention, 10-minute drying at room temperature and 5-minute thermal aftertreatment at around 200° C.

The mechanical properties of the coating and its resistance to water are advantageously produced in particular by the addition of n-propyl zirconate, n-butyl titanate or titanium acetylacetonate as crosslinker.

Additionally, by means of a corresponding addition of dimethyldiethoxysilane, it is possible to improve the hydrophobic effect and the elasticity of the coating. By adding phenylalkoxysilane during the preparation of the coating composition of the invention it is possible to exert an advantageous influence over both the thermal stability and the elasticity of such a coating. The addition of methyltriethoxysilane has the advantageous effect of improving the hydrophobic properties of the coating. Moreover, the scratch resistance and abrasion resistance can be further improved in particular by adding tetraethoxysilane during the preparation of the coating material.

The present invention hence also provides for the use of a composition of the invention for coating substrate surfaces, where the composition is applied to the substrate and thermally cured. Thus, following application of the composition of the invention to the substrate, the coating can be flashed off for suitably from 5 to 15 minutes, preferably around 10 minutes, and cures advantageously at a temperature in the range between 150 to 220° C.

Thus curing can be carried out for example—but not exclusively—under the following conditions: preheat drying unit, then 30 minutes at 150° C. or from 5 to 10 minutes at 180° C. or around 3 minutes at 200° C. or about =1 minute at 220° C.

In this case it is possible to obtain film thicknesses of <1 to 15 μm, preferably from 1 to 10 μm, more preferably from 2 to 5 μm.

The present invention further provides coatings obtainable when inventively using the present compositions.

Coatings of the invention and also substrates or articles thus coated are distinguished with particular advantage by outstanding abrasion resistance and scratch resistance and good weather stability, particularly to UV radiation and rain.

Thus sol-gel systems of the invention are especially suitable for producing mechanically stable, scratch-resistant and abrasion-resistant, highly hydrophobic but also chemical-resistant coatings having an excellent corrosion control effect on metallic surfaces.

Accordingly coatings of the invention are produced with advantage on—preferably, but not exclusively—paper, for production for example of veneer, on paperboard, wood, solid wood for example, chipboard, on plastics, such as melamine, on synthetic fibres, on natural fibres, on textile fibres, on textiles, on leather or leather products, on glass fibres or glass-fibre products, on rock wool or rock-wool products, on coatings, on masonry, ceramic or on metal, such as aluminum, aluminum alloys or steel, on metal sheets or moldings for example, particularly in the auto industry as an intercoat or as a topcoat or as a corrosion preventative, to name but a few examples. Further, particularly advantageous applications may take place on wood surfaces and plastics surfaces, particularly for direct use in the production of furniture for inside and outside. Processing on paper substrates as well is particularly advantageous for an aqueous composition, as for example for protective coatings on decorating paper for producing overlays and for the applications thereof in the furniture industry.

The present invention hence likewise provides articles having a coating of the invention.

Furthermore the present invention provides for the advantageously use of a composition of the present invention as binder for producing foundry molds and foundry cores by combining foundry mold or core sand with the said inventively foundry binder.

The present invention is illustrated by the examples which follow, without restriction as to the subject matter of the invention.

EXAMPLES

Determining the Solids Content in Coating Materials

According to DIN ISO 3251 the solids content of coating materials is the nonvolatiles content, a determination being carried out under well-defined conditions.

Determination of the solids content of the present coating compositions was carried out in a method based on DIN ISO 3251 as follows:

Approximately 1 g of sample was weighed out on an analytical balance (accuracy 1 mg) into a single-use aluminum dish (d=about 65 mm, h=about 17 mm). The product was distributed uniformly in the dish by brief swirling. The dish was stored in a drying cabinet at about 125° C. for 1 hour. After the end of the drying operation the dish was cooled to room temperature in a desiccator for 20 minutes and weighed again on the analytical balance to a precision of 1 mg. For each test it was necessary to carry out at least two determinations, with the mean value reported.

Comparative Example A

A suitable reaction vessel was charged with 278 parts of 3-glycidyloxypropyltriethoxysilane and, with stirring, 278 parts of silica sol (Levasil 200S/30%) were added; cf. Example 11 from DE 198 16 136 A. The mixture was stirred at room temperature for 5 hours. Thereafter the ethanol formed by hydrolysis of the ethoxy groups was distilled off under reduced pressure at 40° C., the viscosity increasing sharply. 6.3% by weight of free ethanol remained in the product. 7.4 g of propionic acid were added to the reaction product, and the resulting mixture was stirred for an hour. Further alkoxy groups were hydrolyzed. The free alcohol content rose to 9.9% by weight. The flash point was 39° C.

A milky white product of high viscosity which is opalescent in transmitted light was obtained.

Example 1

A suitable reaction vessel was charged with 283 parts of 3-glycidyloxypropyltrimethoxysilane (DYNASYLAN® GLYMO) and, in succession and with stirring, 4 parts of concentrated acetic acid, 20 parts of zirconium n-propoxide and 693 parts of silica sol (Levasil 100S/45%) were added. After a few minutes the hydrolysis of the methoxy groups of the 3-glycidyloxypropyltrimethoxysilane began and the temperature rose over the course of 10 minutes by about 10 to 15° C. The reaction mixture was subsequently stirred for 1 hour at a liquid-phase temperature of approximately 55° C.

A milky white, storage-stable coating material of low viscosity, which is opalescent in transmitted light and has a solids content of 52% by weight, was obtained. In addition to water from the silica sol it still contained about 80 parts of hydrolysis methanol as solvent.

Example 2

A suitable reaction vessel was charged with 283 parts of 3-glycidyloxypropyltrimethoxysilane (DYNASYLAN® GLYMO) and, in succession and with stirring, 4 parts of concentrated acetic acid, 20 parts of zirconium n-propoxide and 693 parts of silica sol (Levasil 100S/45%) were added. After a few minutes the hydrolysis of the methoxy groups of the 3-glycidyloxypropyltrimethoxysilane began and the temperature rose over the course of 10 minutes by about 10 to 15° C. The reaction mixture was subsequently stirred for 1 hour at a liquid-phase temperature of approximately 55° C. Then 83 parts of methanol were distilled off under reduced pressure at 54° C. Following distillation, 92 parts of 1-methoxy-2-propanol were added and the product mixture was cooled.

A milky white, storage-stable product of low viscosity, which is opalescent in transmitted light and has a solids content of 54% by weight, was obtained. The flash point was 37° C.

Example 3

A suitable reaction vessel was charged with 76 parts of 3-glycidyloxypropyltrimethoxysilane (DYNASYLAN® GLYMO) and, in succession and with stirring, 8 parts of concentrated acetic acid, 8 parts of zirconium n-propoxide and 159 parts of silica sol (Levasil 100S/45%) were added. After a short time the hydrolysis of the methoxy groups of the 3-glycidyloxypropyltrimethoxysilane began and the temperature rose over the course of 3 minutes by about 10 to 15° C. The reaction mixture was subsequently stirred for 2 hours at a liquid-phase temperature of approximately 70° C. Then 34 parts of methanol were distilled off under reduced pressure at 52° C. During the distillation 40 parts of deionized water were added continuously, dropwise. The product mixture was cooled.

A milky white, storage-stable product of low viscosity, which is opalescent in transmitted light and has a solids content of 53% by weight, was obtained.

Example 4

A suitable reaction vessel was charged with 3 parts of zirconium n-propoxide and, in succession and with stirring, 3 parts of concentrated acetic acid, 60 parts of 3-glycidyloxypropyltrimethoxysilane (DYNASYLAN® GLYMO), 10 parts of tetraethyl orthosilicate (DYNASIL® A) and 104 parts of silica sol (Levasil 100S/45%) were added. After a short time the hydrolysis of the methoxy groups of the 3-glycidyloxypropyltrimethoxysilane began and the temperature rose over the course of 8 minutes by about 15° C. When the maximum temperature was reached, 20 parts of ethanol were added. The reaction mixture was subsequently stirred for 2 hours at a liquid-phase temperature of approximately 75° C. Then 42 parts of methanol/ethanol were distilled off under reduced pressure at 51° C. During the distillation 53 parts of deionized water were added continuously, dropwise. The product mixture was cooled.

A milky white, storage-stable product of low viscosity, which is opalescent in transmitted light and has a solids content of 47% by weight, was obtained.

Example 5

Coating Material for Coatings Having a Hydrophobic and Oleophobic Effect 170 parts of the sol from example 3 were mixed with 30 parts of a water-based, modified fluoroalkylsiloxane (DYNASYLAN® F 8815), with stirring. This gave a liquid milky white to yellow in color which is advantageously suitable for producing hydrophobic and oleophobic, mechanically stable coatings.

Example 6

Coating Material for Coatings Having a Hydrophobic and Oleophobic Effect 170 parts of the sol from example 4 were mixed with 30 parts of a water-based, modified fluoroalkylsiloxane (DYNASYLAN® F 8815), with stirring. This gave a liquid milky white to yellow in color which is advantageously suitable for producing hydrophobic and oleophobic, mechanically stable coatings.

Example 7

A suitable reaction vessel was charged with 71 parts of 3-glycidyloxypropyltrimethoxysilane and, in succession and with stirring, 5 parts of zirconium n-propoxide and, over the course of a further 10 minutes, 171.5 parts of silica sol (Levasil 100S/45%), to which 2.5 parts of maleic add had been added. After a short time the hydrolysis of the methoxy groups of the 3-glycidyloxypropyltrimethoxysilane began and the temperature rose over the course of 20 minutes by about 15 to 20° C. The reaction mixture was subsequently stirred for 1 hour at a liquid-phase temperature of approximately 55° C. Then the methanol formed by the hydrolysis was distilled off under reduced pressure at 54° C. The reaction mixture was diluted with 10% of 1-methoxy-2-propanol and cooled.

A milky white product of low viscosity, which is opalescent in transmitted light and has a solids content of 55% by weight, was obtained.

Example 8

A suitable reaction vessel was charged with 182 parts of 3-glycidyloxypropyltrimethoxysilane (DYNASYLAN® GLYMO) and, in succession and with stirring, 9 parts of concentrated acetic acid, 18 parts of zirconium n-propoxide and 391 parts of silica sol (Levasil 100S/45%) were added. After a short time the hydrolysis of the methoxy groups of the 3-glycidyloxypropyltrimethoxysilane began and the temperature rose over the course of 10 minutes by about 10 to 15° C. The reaction mixture was subsequently stirred for 2 hours at a liquid-phase temperature of approximately 78° C. Then methanol was distilled off under reduced pressure at 53 to 61° C. At the same time as distillation began, 156 parts of deionized water were added. After the end of removal of methanol by distillation a further 70 parts of deionized water were added, in order to replace fractions of deionized water removed by distillation and to adjust the solids content to around 45% or 50% by weight.

A milky white, storage-stable product of low viscosity, which is opalescent in transmitted light and has a solids content of 48% by weight, was obtained.

Table 1 below compares the data of the product from example 8 with those of the product from comparative example A.

TABLE 1

| Determination | Results for | | Method |
| --- | --- | --- | --- |
| | Comp. Ex. A | Example 8 | |
| Solids [% by weight] | 64.0 | 47.6 | DIN EN ISO 3251 |
| Flash point [° C.] | 39 | >90 | EN 22 719 |
| pH | 4.0 | 4.7 | pH stick, Merck |
| Density (20° C.) [g/ml] | 1.244 | 1.241 | DIN 51 757 |
| Viscosity [mPa s] | 3146 | 17.1 | DIN 53 015 |
| Free methanol/ethanol [% by weight] | 9.9[1] | 3.3 | GC |

[1]Prior to addition of propionic acid, free ethanol in an amount of 6.3% by weight was measured.

Tests were also carried out of the coating properties of the products from example 8 and comparative example A. For that purpose the product in comparative example A was diluted to a solids content of 48.1% by weight by adding deionized water. The substrate used comprised aluminum test panels from Pausch, comprising the alloy Alu 3105H24. The panels were precleaned using ethyl acetate and microfiber cloth. The coating systems were applied using a 6-μm doctor blade (12 days after preparation of the products, ambient conditions: 24° C., 45 to 65% relative humidity.). This was followed by drying: 10 minutes at room temperature (24° C.), then 10 minutes at 200° C. The coatings were investigated 1 day after being produced, and the properties found have been compared in Table 2 below.

TABLE 2

| | Coating results for | |
| --- | --- | --- |
| Determination/method | Comp. Ex. A | Example 8 |
| Pencil hardness/ISO 15 184 | 2B | 2H |
| Cross-cut after adhesive-tape removal/DIN EN ISO 2409 | Gt 0 | Gt 0 |
| 2-h boil test | no visual change Gt 0 after adhesive-tape removal | no visual change Gt 0 after adhesive-tape removal |
| Dry film thickness [μm] | 1.8 | 2.2 |
| Visual assessment | homogeneous, transparent, glossy | homogeneous, transparent, glossy |

In summary it is found that the coating material of the invention advantageously possesses a much higher flash point than the composition from comparative example A. Moreover, advantageously, coatings based on the composition of the invention are much harder than those from the comparative experiment.

What is claimed is:

1. A storage stable composition, comprising:
the reaction products of
3-glycidyloxypropyltrimethoxysilane;
a colloidally disperse silica sol having a pH of 3-5 and a solids content of greater than 20 to 50% by weight;
at least one of acetic acid and maleic acid; and
n-propyl zirconate;
wherein
a mean particle diameter of particles of the silica sol is from 40 to 200 nm,
a flash point of the composition is 90° C. or higher,
a chloride content of the composition is less than 0.8% by weight, and
the composition is obtained by hydrolysis and further reaction of a mixture comprising:
(i) 3-glycidyloxypropyltrimethoxysilane,
(ii) the colloidally disperse silica sol,
(iii) an organic acid hydrolysis catalyst selected from the group consisting of acetic acid and maleic acid, and
(iv) n-propyl zirconate as crosslinker;
followed by distillation of alcohol resulting from hydrolysis.

2. The storage stable composition as claimed in claim 1, wherein a content of the n-propyl zirconate is from 0.5 to 8% by weight based on the entire composition.

3. The storage stable composition as claimed in claim 1, wherein the reaction mixture further comprises at least one silane selected from the group consisting of a tetraalkoxysilane, an alkylsilane and a phenyltrialkoxysilane as a component (v).

4. The storage stable composition as claimed in claim 1, wherein a solids content is from greater than 40 to less than 60% by weight, based on the overall composition.

5. The storage stable composition as claimed in claim 1, wherein a content of hydrolysis alcohol is less than 5% by weight, based on the overall composition.

6. The storage stable composition as claimed in claim 1, further comprising from 5 to 10% by weight of 1-methoxy-2-propanol, based on the overall composition.

7. The storage stable composition as claimed in claim 1, wherein a content of water is from 30 to 70% by weight, based on the overall composition.

8. The storage stable composition as claimed in claim 1, further comprising at least one surfactant.

9. The storage stable composition as claimed in claim 1, further comprising a hydrosil system.

10. The storage stable composition as claimed in claim 1, further comprising a diluent, wherein the diluent is water or 1-methoxy-2-propanol.

11. The storage stable composition as claimed in claim 1, hydrolysis reaction is conducted at a temperature of from 0 to 35° C. for a time of from 1 to 60 minutes and the hydrolysis product mixture is allowed to afterreact at a temperature of from 35 to 85° C. for from 10 minutes to 4 hours.

12. The storage stable composition as claimed in claim 1, further comprising replacing the amount of alcohol removed by a corresponding amount of water.

13. A foundry mold or foundry core, comprising:
the storage stable composition claimed in claim 1 as a binder.

14. A method of coating a substrate surface, comprising:
coating the substrate surface with a composition which comprises the storage stable composition as claimed in claim 1, to obtain a coated substrate.

15. The method as claimed in claim 14, further comprising thermally curing the coated substrate.

16. The method as claimed in claim 14, wherein said substrate surface comprises paper, paperboard, wood, chipboard, plastic, synthetic fibers, natural fibers, textile fibers, textiles, leather, glass fibers, rock wool, paint coats, masonry, ceramic, metal or metal alloys.

17. A coating obtained by applying the storage stable composition as claimed in claim 1 to a substrate surface and curing the applied coating.

18. An article, comprising a coating as claimed in claim 17.

19. A curable coating agent, comprising the composition as claimed in claim 1.

20. The storage stable composition as claimed in claim 1, wherein component (iii) is acetic acid.

* * * * *